M. WAINOLA.
TOY.
APPLICATION FILED APR. 7, 1920.

1,396,902.

Patented Nov. 15, 1921.

INVENTOR
Matti Wainola
BY
Edmund A. [signature]
ATTORNEY

UNITED STATES PATENT OFFICE.

MATTI WAINOLA, OF LOS ANGELES, CALIFORNIA.

TOY.

1,396,902.  Specification of Letters Patent.  Patented Nov. 15, 1921.

Application filed April 7, 1920. Serial No. 372,032.

*To all whom it may concern:*

Be it known that I, MATTI WAINOLA, a citizen of Finland, residing at Los Angeles, in the county of Los Angeles and State of California, have invented new and useful Improvements in Toys, of which the following is a specification.

My invention relates to toys and is designed as a novelty to be unique, ornamental and amusing.

The objects of my invention will be apparent from the following description and by reference to the accompanying drawings, in which.

Figure 1:
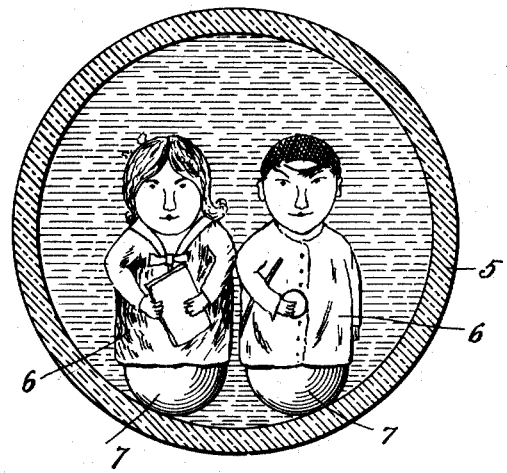
Figure 1 represents a sectional view through a hollow transparent spherical container embodying by invention.

In carrying out my invention and referring to Fig. 1 of the drawings, 5 represents a hollow transparent spherical liquid tight receptacle, adapted to receive one or more bodies, simulating either animate or inanimate images 6. The receptacle is filled with water or any other desired liquid which may be perfectly clear or suitably colored as desired. The images are preferably weighted as at 7, in order that they may at all times be maintained in an upright position, and said weights are preferably hemispherical in shape in order that a single point of contact with the interior wall of the receptacle may be obtained.

Figure 2:
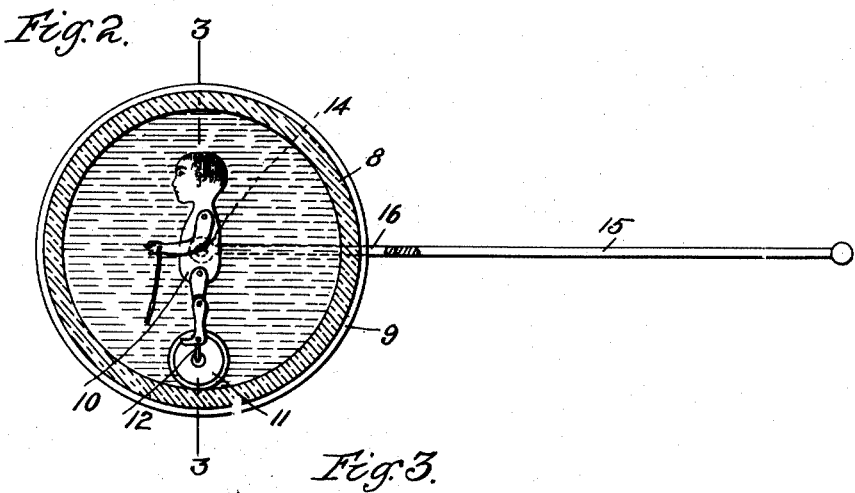
Fig. 2 represents in section a modified form of my invention.
Figure 3:
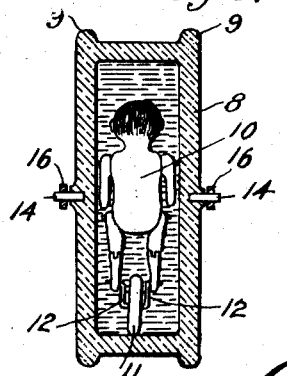
Fig. 3 is a section of the same taken on the line 3—3 of Fig. 2.

In Figs. 2 and 3 of the drawings, I have shown a different from of receptacle which is disk shaped, as shown at 8, and said receptacle is provided with the annular flanges 9 adapted to roll upon the floor or upon a table. By providing the flanges it will be obvious that the face of the disk will not be in contact with the floor and thus no dirt will be accumulated thereon. The form of receptacle shown in Figs. 2 and 3 is especially adapted to receive a mechanically jointed object, such as is shown at 10, the wheel 11 of which is comparatively heavy and is provided with a crank 12 upon which the object is pivoted. The particular object illustrated at 10 represents a jointed figure of a boy carrying a flag, and is so mounted in said receptacle that it will be confined between the side walls thereof in order that it will not be permitted to twist around. By this arrangement it is obvious that the image 10 will face in the same direction at all times.

In order that the receptacle 8 may be conveniently rolled along the floor or on a table, I have provided the side thereof with trunnions 14, to which is pivoted a suitable handle 15, which is bifurcated as at 16 to straddle said receptacle.

The liquid in the receptacle acts to stabilize the images and to prevent them from moving too rapidly, thus they will move gracefully in the receptacle when it is rolled along on the floor.

It is obvious that the objects in the receptacle may represent any animate or inanimate image, such for instance as a doll, ship, fish or frog which may be jointed or not in order to produce the desired effect.

In the operation of the toy the receptacle may be agitated or rolled on the floor, thus the objects contained therein will make various gyrations which are very amusing and natural; thus if the sphere containing the two doll images is rolled along, the images will twirl around and present the appearance of waltzing together. The image shown in Figs. 2 and 3 when the receptacle is rolled along, will bend its knees and body upwardly and downwardly and the resistance afforded by the flag will cause the arms to move in a graceful manner on their pivots.

What I claim is:

A toy, comprising a spherical transparent body completely filled with a liquid, and a weighted figure completely submerged in said liquid, whereby when the body is rolled the weighted figure disposed therein will revolve.

In witness that I claim the foregoing I have hereunto subscribed my name this 16th day of March, 1920.

MATTI WAINOLA.